United States Patent [19]

Kimura et al.

[11] Patent Number: 5,722,042
[45] Date of Patent: Feb. 24, 1998

[54] SATELLITE COMMUNICATION SYSTEM HAVING DOUBLE-LAYERED EARTH ORBIT SATELLITE CONSTELLATION WITH TWO DIFFERENT ALTITUDES

[75] Inventors: Kazuhiro Kimura; Yoshio Karasawa, both of Nara, Japan

[73] Assignee: ATR Optical and Radio Communications Research Laboratories, Kyoto, Japan

[21] Appl. No.: 541,268

[22] Filed: Oct. 12, 1995

[30] Foreign Application Priority Data

Feb. 6, 1995 [JP] Japan .................................. 7-017833

[51] Int. Cl.$^6$ .................................................. H04B 7/185
[52] U.S. Cl. ........................................ 455/13.1; 342/352
[58] Field of Search ................................ 455/12.1, 13.1; 370/316; 342/352, 353, 355

[56] References Cited

U.S. PATENT DOCUMENTS 4,240,079  12/1980  Zhilin ...................................... 342/352
4,985,706  1/1991  Schukat ................................... 342/352

OTHER PUBLICATIONS

Edward F. Tuck et al., "The Calling$^{SM}$ Network": A Global Wireless Communication System:, International Journal of Satellite Communications, vol. 12, pp. 45–61 (1994).
John M. Ruddy et al., "Concept for a Cost/Technology-Driven Mobile Satellite Communications (Mobilsatcom) System", The American Institute of of Aeronautics and Astonautics, Inc., AIAA–90–0864–CP, (1990).

Hans–Cristian Haugli et al., "Inmarsat's Future Personal Communicator System", International Mobile Satellite Conference IMSC'93, California, pp. 129–140, Jun. 1993

Raymond J. Leopold et al., "Low–Earth Orbit Global Cellular Communications Network", Mobile Satellite Communication System Conference, pp.59–65, Aug. 1990.

*Primary Examiner*—Thomas Mullen

[57] ABSTRACT

A satellite communication system has a double-layered earth orbit satellite constellation with a lower first orbit altitude and a higher second orbit altitude. In the satellite communication system, first and second communication satellites are deployed in respective earth orbits located at the first and second orbit altitudes to each have first and second satellite communication stations, respectively. Small terminals and large terminals are further provided as earth stations on the earth. Each first satellite communication station communicates with the small terminals and communicates with the first satellite communication stations of adjacent first communication satellites within the same earth orbit and the second satellite communication stations, and each second satellite communication station communicates with the large terminals and communicates with the second satellite communication stations of adjacent communication satellites within the same earth orbit, the second satellite communication stations of the second communication satellites of both adjacent earth orbits, and the first satellite communication stations.

6 Claims, 12 Drawing Sheets

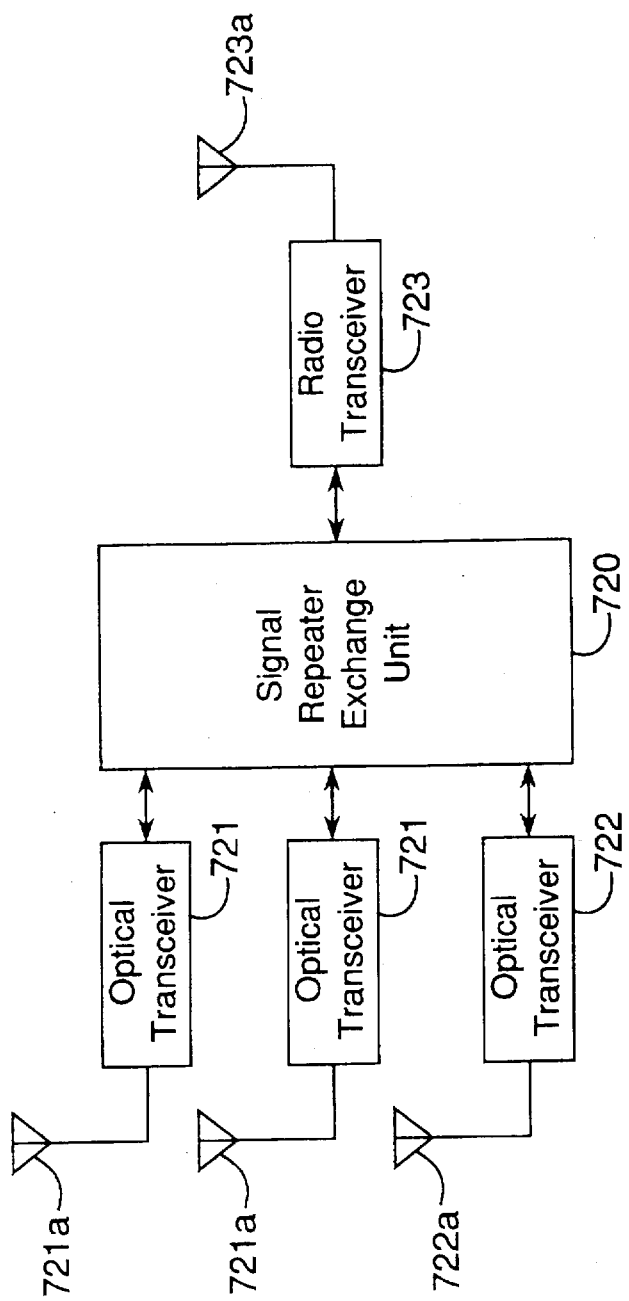
Fig.12  Satellite Stations 111-113, 121-123, 131-134, 141-144, 151-154, 161-163 on EO Satellites 1 of First Layer

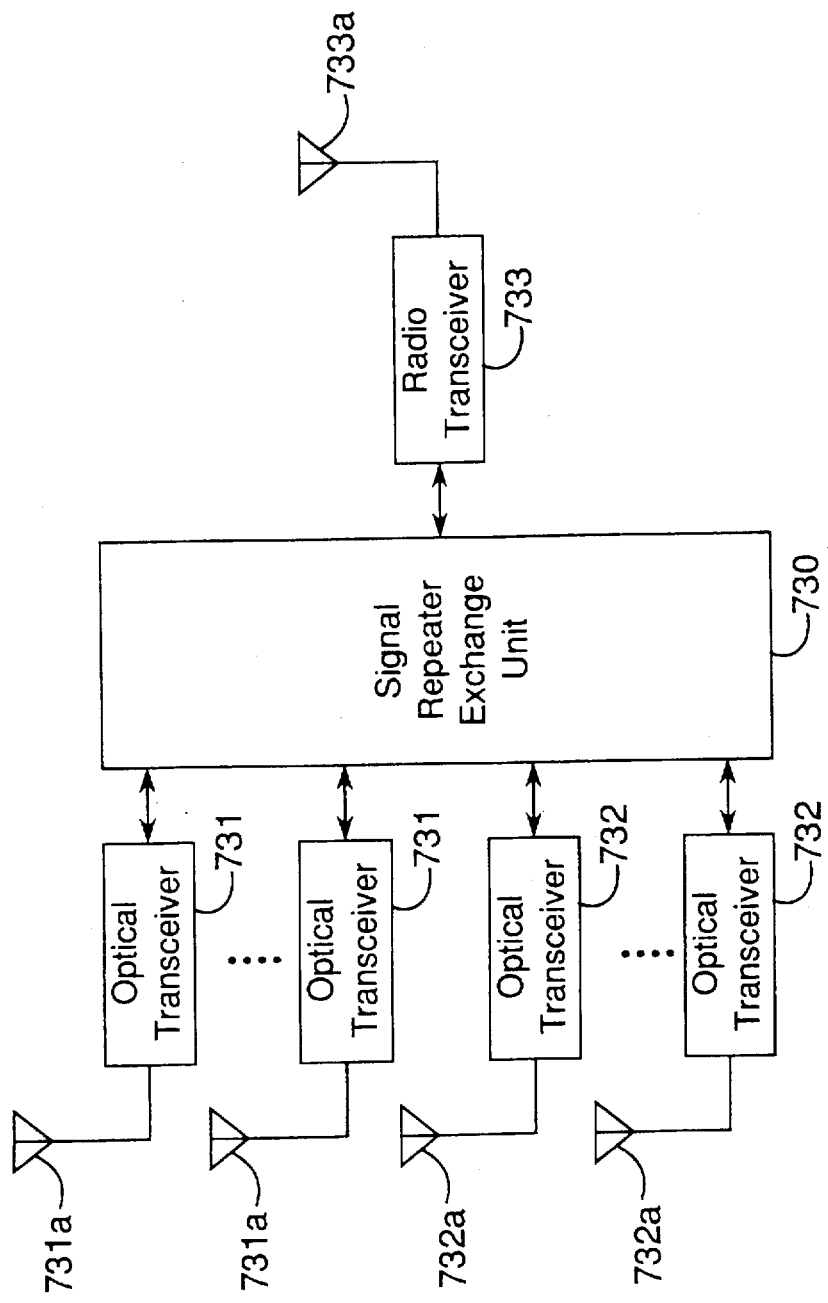

SATELLITE COMMUNICATION SYSTEM HAVING DOUBLE-LAYERED EARTH ORBIT SATELLITE CONSTELLATION WITH TWO DIFFERENT ALTITUDES

BACKGROUND OF THE INVENTION

1. Field of the Invention

The present invention relates to a satellite communication system, and more particularly, to a satellite communication system having a double-layered earth orbit satellite constellation with two different altitudes.

2. Description of the Related Art

In recent years, a number of global communication network systems using a low earth orbit (LEO) or a middle earth orbit (MEO) satellite constellation have been discussed and developed. Some of the communication systems will be deployed in orbit and be in full operation in the near future. Iridium, Inmarsat Project 21, and Teledesic (Calling) are typical global satellite communication systems. In these communication systems, inter-satellite links using radio frequencies are used for relaying data from a satellite to the other satellites adjacent thereto. However, optical inter-satellite links (referred to as ISLs hereinafter) will be applied into future satellite communication systems, since the optical ISLs provide more excellent features compared with ISLs using radio frequencies.

For instance, a first prior art document (E. F. Tuck et al., "THE CALLING$^{SM}$ NETWORK: A GLOBAL WIRELESS COMMUNICATION SYSTEM", International Journal of Satellite Communications, Vol. 12, pp. 45–61, 1994) discloses that 840 satellites are deployed at an altitude of 700 km to provide a wide range of communication service to targets of mobile objects to large-size terminals.

A second prior art document (J. M. Ruddy et al., "CONCEPT FOR A COST/TECHNOLOGY-DRIVEN MOBILE SATELLITE COMMUNICATIONS (MOBILSATCOM) SYSTEM", 13th AIAA International Satellite Systems Conference, pp. 720–730, 1991) discloses that a mobile communication service is provided by using 192 low earth orbit satellites and data is relayed by using one geostationary satellite.

In the system of the above-mentioned first prior art document, since communication functions required for the satellite communication are mounted on all the 840 satellites, it is necessary to provide a large number of satellite stations each having multiple functions and a complex structure. This results in that the cost of the satellite communication system becomes extremely expensive.

In the system of the above-mentioned second prior art document, since the geostationary satellite deployed at an extremely high altitude is used for the communication, the propagation delay for the satellite communication becomes extremely large. Further, all the communications are concentrated on one stationary satellite. This results in such a disadvantage that it is difficult to provide a communication service having a large capacity.

As the standards of communication services are improved, increases in the required minimum elevation angle of satellites from an arbitrary point on the earth are expected for reduction in communication link interruptions caused by shadowing by buildings or by geographical factors. Furthermore, continuous coverage by two or more satellites will be required to ensure the possible redundancy of routing and link assignments and to implement the diversity of satellites. This extended coverage will require a great increase in the number of satellites in the constellation. For example, about 600 satellites are necessary for continuous double or more coverage worldwide with a minimum elevation angle of more than 30 degrees for a satellite altitude of 750 km. If each of the satellites were provided with all known functions of communications, that is, links with user terminals, feeder links with gateway stations, and inter-satellite links with more than four adjacent satellites, all of a large number of satellites would be large and heavy. Further, several tens of hops of inter-satellite data transmission would be required in the satellite communication system so that the network configuration and selection of the optimum routes would become complex, respectively. Furthermore, the propagation delay involved in a signal processing at all the satellites on the transmission route becomes large. These problems could be reduced by using orbits located at high altitudes. However, there is such a problem that this solution increases the ranges between user terminals and satellites so that the free-space propagation loss becomes large, and therefore, this results in that it is necessary to increase the size and the output power of the user terminals.

SUMMARY OF THE INVENTION

An object of the present invention is to provide a satellite communication system capable of providing a high-quality satellite communication service with a less propagation loss as compared with the prior art satellite systems.

Another object of the present invention is to provide a satellite communication system comprising satellite communication stations each having a structure simpler than that of the conventional satellite communication station.

In order to achieve the aforementioned objective, according to the present invention, there is provided a satellite communication system having a double-layered earth orbit satellite constellation with two different altitudes including a predetermined first orbit altitude and a predetermined second orbit altitude higher than the first orbit altitude, comprising:

a plurality of first communication satellites deployed in each of a plurality of earth orbits located at the first orbit altitude, each of said plurality of first communication satellites having a first satellite communication station;

a plurality of second communication satellites deployed in each of a plurality of earth orbits located at the second orbit altitude, each of said plurality of second communication satellites having a second communication satellite station;

a plurality of small terminals provided as earth stations on the earth, each of said plurality of small terminals being used as either one of a mobile terminal and a semi-fixed terminal; and a plurality of large terminals provided as earth stations on the earth, each of said plurality of large terminals being used as a fixed terminal, wherein each of said first satellite communication stations comprises:

first communication means for communicating with at least one of said plurality of small terminals and for communicating with at least one of said first satellite communication stations of adjacent first communication satellites within the same earth orbit and said plurality of second satellite communication stations; and first repeater exchange means for relaying and switching a signal of at least two of said communications performed by said first communication means, wherein each of said second satellite communication stations comprises:

second communication means for communicating with at least one of said plurality of large terminals and for communicating with at least one of said second satellite communication stations of adjacent communication satellites within the same earth orbit, said second satellite communication stations of said second communication satellites of both adjacent earth orbits, and said plurality of first satellite communication stations; and second repeater exchange means for relaying and switching a signal of at least two of said communications performed by said second communication means, wherein each of said small terminals comprises third communication means for communicating with at least one of said plurality of first satellite communication stations, and wherein each of said large terminals comprises fourth communication means for communicating with at least one of said plurality of second satellite communication stations.

In the above-mentioned satellite communication system, said first orbit altitude is preferably set to an altitude within a range of 700 km to 2000 km, and wherein said second orbit altitude is preferably set to an altitude within either one range of a range of 1200 km to 2000 km and a range of 10000 km to 20000 km.

In the above-mentioned satellite communication system, (a) communications between one of said first satellite communication stations and another one of said first satellite communication stations, (b) communications between one of said second satellite communication stations and another one of said second satellite communication stations, and (c) communications between said first satellite communication stations and said second satellite communication stations are carried out through optical satellite communication lines, and wherein (d) communications between said first satellite communication stations and said small terminals, and (e) communications between said second satellite communication stations and said large terminals are carried out through radio satellite communication lines.

In the above-mentioned satellite communication system, (a) communications between one of said first satellite communication stations and another one of said first satellite communication stations, (b) communications between one of said second satellite communication stations and another one of said second satellite communication stations, (c) communications between said first satellite communication stations and said second satellite communication stations, (d) communications between said first satellite communication stations and said small terminals, and (e) communications between said second satellite communication stations and said large terminals are carried out through radio satellite communication lines.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 12 is a block diagram showing a composition of each of satellite stations 111 through 113, 121 through 123, 131 through 134, 141 through 144, 151 through 154, and 161 through 163 provided on earth orbit satellites 1 of the first layer in the satellite communication system shown in FIG. 1; and FIG. 13 is a block diagram showing a composition of each of satellite stations 211, 212, 221, 222, 231, and 232 provided on earth orbit satellites 2 of the second layer in the satellite communication system shown in FIG. 1.

DETAILED DESCRIPTION OF THE PREFERRED EMBODIMENTS

Preferred embodiments according to the present invention will be described below with reference to the attached drawings.

Figure 1:
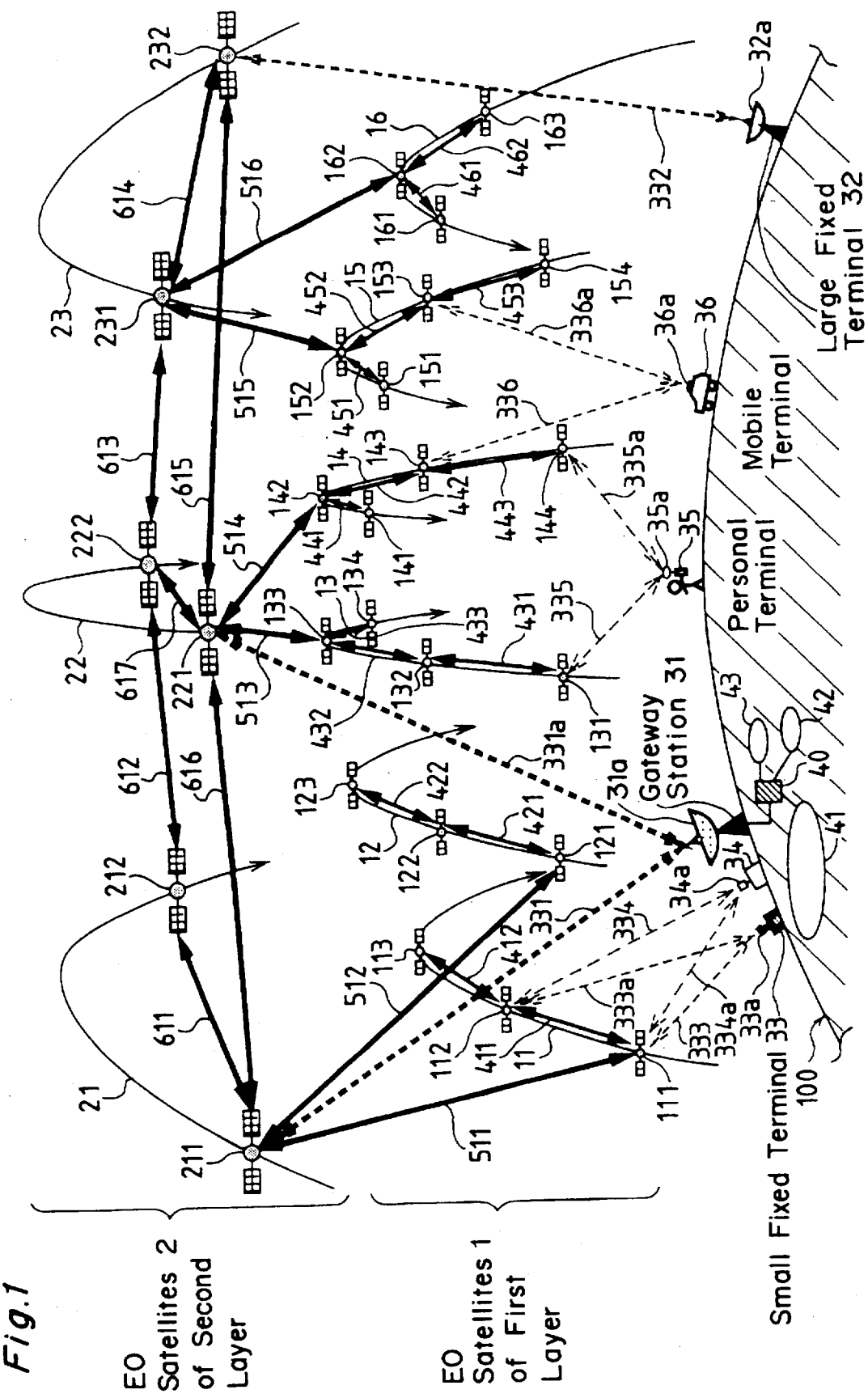
FIG. 1 is an external view showing a configuration of a satellite communication system according to a first preferred embodiment of the present invention.

FIG. 1 is a perspective view showing a configuration of a satellite communication system of a preferred embodiment according to the present invention.

Referring to FIG. 1, the satellite communication system of the present preferred embodiment has a double-layered satellite constellation with two different orbit altitudes, wherein the satellite constellation comprises earth orbit satellites (referred to as EO satellites hereinafter) 1 of a first layer and EO satellites 2 of a second layer. It is noted that the communication satellite is herein abbreviated as a satellite. This satellite constellation is a combination of advantageous merits of the low earth orbit satellite constellation and the middle earth orbit satellite constellation. On the EO satellites 1 of the first layer which is a lower layer, for example, satellite communication stations 111 through 113, 121 through 123, 131 through 134, 141 through 144, 151 through 154, and 161 through 163 are arranged on several hundreds of satellites which provide communication services to small user terminals 33, 34, 35 and 36. On the other hand, on the EO satellites 2 of the second layer which is an upper or higher layer, for example, several tens of satellite communication stations 211, 212, 221, 222, 231 and 232 are arranged for relaying data from the satellite communication stations of the EO satellites 1 of the first layer, to the satellite communication stations of the satellites within orbital planes other than those of the satellite communication stations of the EO satellites 1 of the first layer, and to an earth-based gateway station 31. In this satellite constellation, an optical inter-satellite communication is used for data links among all the satellites, and therefore, the size of the EO satellites 1 of the lower first layer can be reduced. Indeed the EO satellite 2 of the upper second layer becomes relatively complex and large, however, the satellite constellation has such an advantageous feature that the required number of satellites is quite small. In addition, in the present preferred embodiment, communications between earth stations and satellite communication stations are carried out through a radio satellite communication line or circuit by a radio satellite communication method while communications between two satellite communication stations of the same layer or of different layers are carried out through an optical satellite communication line or circuit by an optical satellite communication method.

First of all, the configuration of the satellite communication system of the present preferred embodiment will be described below in detail.

As shown in FIG. 1, in first earth orbits 11 through 16 which are so-called low earth orbits located at a predetermined altitude within an altitude range of, preferably, 700 km to 2000 km, the EO satellites 1 of the lower first layer are deployed so as to orbit therein. The EO satellites 1 of the first layer comprises the satellites carrying the satellite communication stations 111 through 113, 121 through 123, 131 through 134, 141 through 144, 151 through 154, and 161 through 163, of the first layer. In the present preferred embodiment, the satellites carrying the satellite communication stations 111 through 113 are deployed in the earth orbit 11. The satellites carrying the satellite communication stations 121 through 123 are deployed in the earth orbit 12. The satellites carrying the satellite communication stations 131 through 134 are deployed in the earth orbit 13. The satellites carrying the satellite communication stations 141 through 144 are deployed in the earth orbit 14. The satellites carrying the satellite communication stations 151 through 154 are deployed in the earth orbit 16. The satellites carrying the satellite communication stations 161 through 163 are deployed in the earth orbit 16.

Further, in earth orbits 21 through 23 of the second layer, which are so-called middle earth orbits located at a predetermined altitude higher than that of the EO satellites 1 of the first layer and preferably within an altitude range of 1200 km to 2000 km or an altitude range of 10000 km to 20000 km, and more preferably at an altitude within a range of 10000 km to 20000 km, the EO satellites 2 of the second layer which is the higher layer, are deployed so as to orbit therein. The EO satellites 2 of the second layer comprises the satellites carrying satellite communication stations 211, 212, 221, 222, 231 and 232 of the second layer. In addition, when the orbit altitude of the EO satellites 1 of the first layer is 1200 km or more, the orbit altitude of the EO satellites 2 of the second layer is preferably set to 10000 km or more. In the present preferred embodiment, the satellites carrying the satellite communication stations 211 and 212 are deployed in the earth orbit 21. The satellites carrying the satellite communication stations 221 and 222 are deployed in the earth orbit 22. The satellites carrying the satellite communication stations 231 and 232 are deployed in the earth orbit 23.

In the present preferred embodiment, it is undesirable to deploy the satellites carrying satellite communication stations of the satellite system in earth orbits located at altitudes in a range of 2000 km to 10000 km, since equipments or units and solar cells of the satellite communication stations may be damaged or deteriorated by radiation of high intensity around the Van Allen band with the above range of altitudes. It is further inappropriate to deploy the satellites at altitudes of 700 km or less because of drag due to the atmosphere. Thus, appropriately, the altitude of the low earth orbit for the EO satellites 1 of the first layer is within a range of, preferably, 700 km to 2000 km. Further, appropriately, the altitude of the medium earth orbit for the EO satellites 2 of the second layer is within a range of, preferably, 1200 km to 20000 km, more preferably, 10000 km to 20000 km.

In the present preferred embodiment, a large number of communication satellites are deployed and maintained in earth orbits having two different orbit altitudes into a double-layered satellite constellation, and all the satellites are linked by inter-satellite links so as to form a global communication network, and then, continuous services such as communication, broadcasting, positioning and the like are provided to every area on the earth. In this arrangement, the satellites are disposed in each case of the EO satellites 1 and 2 of the first and second layer in such a manner that satellite communication services can be offered continuously on every area on the earth by only a group of satellites belonging to the relevant layer, with one or more satellites of the satellite communication stations remaining at necessary elevation angles or more.

On the earth 100, on the other hand, a gateway station 31 and a large fixed terminal 32 are arranged as earth stations of large satellite communication terminals. The gateway station 31 and the large fixed terminal 32 are equipped with parabola antennas 31a and 32a, respectively, wherein each of parabola antennas 31a and 32a has a relatively large diameter, and is mechanically driven to track satellites that implement the satellite communications.

Figure 10:
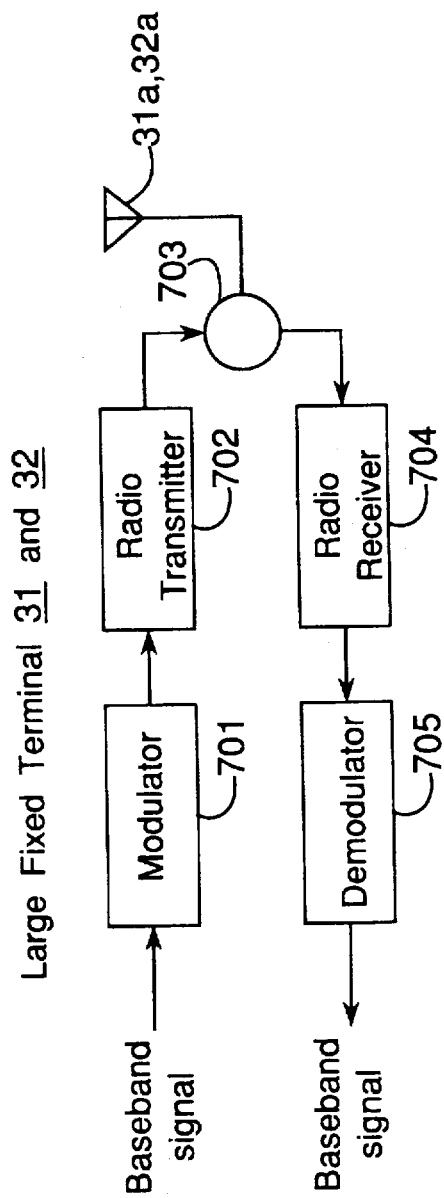
FIG. 10 is a block diagram showing a composition of each of the large fixed terminals 31 and 32 provided in the satellite communication system shown in FIG. 1.

FIG. 10 is a block diagram showing a composition of each of the large fixed terminals 31 and 32 provided in the satellite communication system shown in FIG. 1.

Referring to FIG. 10, each of these large terminals 31 and 32 comprises the following in order to implement communications with the satellite communication stations of the EO satellites 2 of the second layer:

(a) a modulator 701 which modulates a carrier signal of a predetermined intermediate frequency in accordance with an inputted baseband signal such as a speech signal, a data signal, a frequency-division multiplex signal of these signals, a time-division multiplex signal of these signals or the like to obtain an intermediate frequency signal (referred to as an IF signal hereinafter), and then, outputs the IF signal to a radio transmitter 702;

(b) the radio transmitter 702 which frequency-converts the IF signal outputted from the modulator 701, into a radio signal of a predetermined satellite communication frequency in frequency bands such as a quasi-millimeter wave band, a millimeter wave band or the like, and then, transmits the converted radio signal through an antenna circulator 703 from each of the parabola antennas 31a and 32a toward the antennas of the satellite communication stations of the EO satellites 2 of the second layer;

(c) a radio receiver 704 which receives a radio signal received from the satellite communication stations of the EO satellites 2 of the second layer through each of the parabola antennas 31a and 32a and the antenna circulator 703, frequency-converts the received radio signal into an IF signal of a predetermined intermediate frequency, and then, outputs the IF signal to a demodulator 705; and (d) the demodulator 705 which demodulates the IF signal outputted from the radio receiver 704 to convert the IF signal into a baseband signal, and then outputs the same baseband signal.

In the present preferred embodiment, referring back to FIG. 1, the gateway station 31 is connected with earth-based networks 41 through 43 via a repeater exchange unit 40 provided on the ground of the earth 100.

The gateway station 31 is, for example, connected with the satellite communication station 211 via a communication path 331, and is connected with the satellite communication station 221 via a communication path 331a. The large fixed terminal 32 is, for example, connected with the satellite communication station 232 via a satellite communication path 332. That is, each of the gateway station 31 and the large fixed terminal 32 communicates with the satellite communication stations of the EO satellites 2 of the second layer via communication paths with relatively large free space loss.

On the earth 100, on the other hand, there are provided the small fixed terminals 33 and 34, the personal terminal 35, and the mobile terminal 36, as earth stations for small-size satellite communication user terminals. The small fixed terminals 33 and 34 are used so as to be semi-fixed, that is, the small fixed terminals 33 and 34 are mobile, however, they are fixed at the time of communication. The personal terminal 35 is a hand-held personal terminal which can be carried and moved by men. The mobile terminal 36 is provided on a movable object such as automobiles, ships, airplanes or the like. The terminals 33 through 36 are provided with antennas that do not track the satellites or phased array antennas 33a through 36a which can electrically track the satellites at high speed, respectively.

Figure 11:
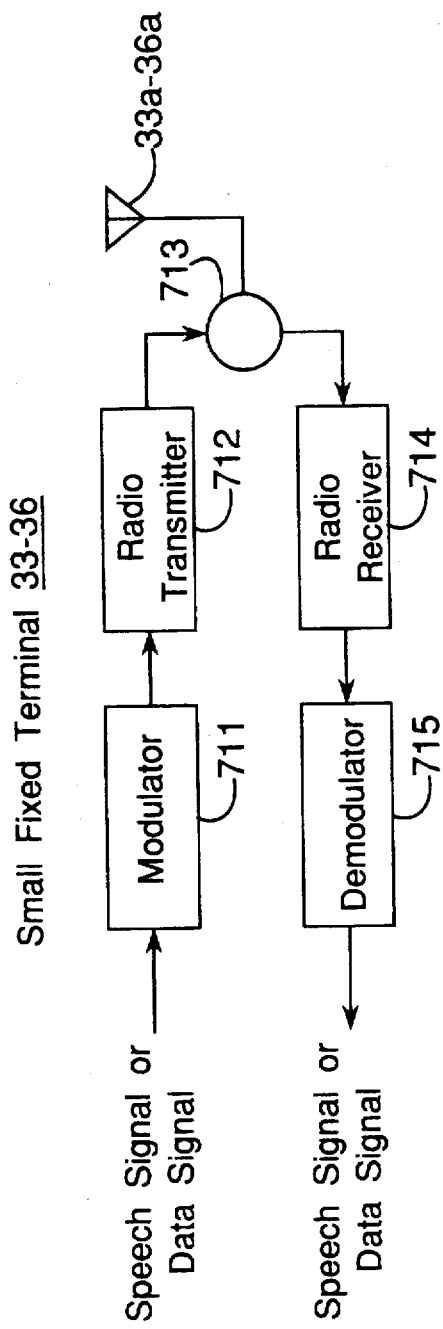
FIG. 11 is a block diagram showing a composition of each of the small fixed terminals 33 through 36 provided in the satellite communication system shown in FIG. 1.

FIG. 11 is a block diagram showing a composition of each of the small fixed terminals 33 through 36 provided in the satellite communication system shown in FIG. 1.

Referring to FIG. 11, in order to perform the communications with satellite communication stations of the EO satellites 1 of the first layer, each of these small terminals 33 through 36 comprises the following:

(a) a modulator 711 which modulates a carrier signal of a predetermined intermediate frequency in accordance with an inputted baseband signal such as a speech signal, a data signal, or the like to obtain an IF signal, and then, outputs the IF signal to a radio transmitter 712;

(b) the radio transmitter 712 which frequency-converts the IF signal outputted from the modulator 711, into a radio signal of a predetermined satellite communication frequency in frequency bands such as a quasi-millimeter wave band, a millimeter wave band or the like, and then, transmits the converted radio signal through an antenna circulator 713 from each of the antennas 33a through 36a toward the antennas of the satellite communication stations of the EO satellites 1 of the first layer;

(c) a radio receiver 714 which receives a radio signal received from the satellite communication stations of the EO satellites 1 of the first layer through each of the antennas 33a through 36a and the antenna circulator 713, frequency-converts the received radio signal into an IF signal of a predetermined intermediate frequency, and then, outputs the IF signal to a demodulator 715; and (d) the demodulator 715 which demodulates the IF signal outputted from the radio receiver 714 to convert the IF signal into a baseband signal, and then outputs the same baseband signal.

Referring back to FIG. 1, the small fixed terminal 33 is, for example, connected with the satellite communication station 111 via a communication path 333, or is connected with the satellite communication station 112 via a communication path 333a. The small fixed terminal 34 is, for example, connected with the satellite communication station 111 via a communication path 334, or is connected with the satellite communication station 112 via a communication path 334a. The personal terminal 35 is, for example, connected with the satellite communication station 131 via a communication path 335, or is connected with the satellite communication station 144 via a communication path 335a. The mobile terminal 36 is, for example, connected with the satellite communication station 143 via a communication path 336, or is connected with the satellite communication station 153 via a communication path 136. Accordingly, each of these small terminals 33 through 36 communicates with satellite communication stations of the EO satellites 1 of the first layer via communication paths each having smaller free space loss as compared with that of each of the satellite communication paths 331, 331a and 332 of the gateway station 31 and the large fixed terminal 32.

FIG. 12 is a block diagram showing a composition of each of satellite stations 111 through 113, 121 through 123, 131 through 134, 141 through 144, 151 through 154, and 161 through 163 provided on earth orbit satellites 1 of the first layer in the satellite communication system shown in FIG. 1.

Referring to FIG. 12, each of the satellite communication stations 111 through 113, 121 through 123, 131 through 134, 141 through 144, 151 through 154, and 161 through 163 of the EO satellites 1 of the first layer comprises:

(a) two optical inter-satellite communication transceivers 721 for performing communications of optical inter-satellite links with the satellite communication stations of both adjacent satellites within the same orbital plane, wherein each of the optical inter-satellite communication transceivers 721 is connected with an optical antenna 721a, and is provided for converting an inputted baseband signal into a modulated optical signal by modulating an optical signal according to the inputted baseband signal, and then transmitting the modulated optical signal through the optical antenna 721a toward the satellite communication stations of both adjacent satellites within the same orbital plane, whereas it is provided for receiving a modulated optical signal received from the satellite communication stations of both adjacent satellites within the same orbital plane through the optical antenna 721a, and then converting the received optical signal into a baseband signal;

(b) an optical inter-satellite communication transceiver 722 for performing communications of optical inter-satellite links with the satellite communication stations 211, 212, 221, 222, 231, and 232 carried on the EO satellites 2 of the second layer, wherein the optical inter-satellite communication transceiver 722 is connected with an optical antenna 722a, and is provided for converting an inputted baseband signal into a modulated optical signal by modulating an optical signal according to the inputted baseband signal, and then transmitting the modulated optical signal through the optical antenna 722a toward the satellite communication stations 211, 212, 221, 222, 231, and 232 carried on the EO satellites 2 of the second layer, whereas it is provided for receiving a modulated optical signal received from the satellite communication stations 211, 212, 221, 222, 231, and 232 carried on the EO satellites 2 of the second layer through the optical antenna 722a, and then converting the received optical signal into a baseband signal;

(c) a radio satellite-communication transceiver 723 for performing radio communications with the earth-based small terminals 33 through 36, wherein the radio satellite-communication transceiver 723 is connected with a phased array antenna 723a, and is provided for converting an inputted baseband signal into a radio signal by modulating a radio carrier signal according to the inputted baseband signal, and then transmitting the radio signal through the phased array antenna 723a toward the earth-based small terminals 33 through 36, whereas it is provided for receiving a radio signal from the earth-based small terminals 33 through 36 through the antenna 723a, and then converting the received radio signal into a baseband signal by demodulating the received radio signal; and (d) a signal repeater exchange unit 720 connected with these transceivers 721, 722 and 723 for relaying and switching a baseband signal from one of the transceivers 721, 722 and 723 to another one of the transceivers 721, 722 and 723 while amplifying the same baseband signal.

In this arrangement, for example, the satellite communication station 111 is connected with the small fixed terminals 33 and 34 via the communication paths 333 and 334a, respectively, and is further connected with the satellite communication station 112 via a communication path 411 and also to the satellite communication station 211 via a communication path 511. Further, for example, the satellite communication station 131 is connected with the personal terminal 35 via the communication path 335, and is connected with the satellite communication station 132 via a communication path 431. Accordingly, each of the satellite communication stations 111 through 113, 121 through 123, 131 through 134, 141 through 144, 151 through 154, and 161 through 163 carried on the EO satellites 1 of the first layer has a function of relay switching communication signals between the earth-based small terminals, and another function of relay switching communication signals between the satellite communication stations of the EO satellites 1 and 2 of the first and second layers.

FIG. 13 is a block diagram showing a composition of each of satellite stations 211, 212, 221, 222, 231, and 232 provided on the EO satellites 2 of the second layer in the satellite communication system shown in FIG. 1.

Referring to FIG. 13, each of the satellite communication stations 211, 212, 221, 222, 231 and 232 of the EO satellites 2 of the second layer comprises the followings:

(a) a plurality of optical inter-satellite communication transceivers 731 for performing communications of optical inter-satellite links with the satellite communication stations of both adjacent satellites within the same orbital plane and the satellite communication stations of the satellites on both adjacent earth orbits, wherein each of the optical inter-satellite communication transceivers 731 is connected with an optical antenna 731a, and is provided for converting an inputted baseband signal into a modulated optical signal by modulating an optical signal according to the inputted baseband signal, and then transmitting the modulated optical signal through the optical antenna 731a toward the satellite communication stations of both adjacent satellites within the same orbital plane and the satellite communication stations of the satellites on both adjacent earth orbits, whereas it is provided for receiving a modulated optical signal received from the satellite communication stations of both adjacent satellites within the same orbital plane and the satellite communication stations of the satellites on both adjacent earth orbits through the optical antenna 731a, and then converting the received optical signal into a baseband signal;

(b) a plurality of optical inter-satellite communication transceivers 732 for performing communications of optical inter-satellite links with the satellite communication stations carried on the EO satellites 1 of the first layer, wherein each of the optical inter-satellite communication transceivers 732 is connected with an optical antenna 732a, and is provided for converting an inputted baseband signal into a modulated optical signal by modulating an optical signal according to the inputted baseband signal, and then transmitting the modulated optical signal through the optical antenna 732a toward the satellite communication stations carried on the EO satellites 1 of the first layer, whereas it is provided for receiving a modulated optical signal received from the satellite communication stations carried on the EO satellites 1 of the first layer through the optical antenna 732a, and then converting the received optical signal into a baseband signal;

(c) a radio satellite-communication transceiver 733 for performing radio communications with the earth-based large terminals 31 and 32, wherein the radio satellite-communication transceiver 733 is connected with a parabola antenna 733a, and is provided for converting an inputted baseband signal into a radio signal by modulating a radio carrier signal according to the inputted baseband signal, and then transmitting the radio signal through the parabola antenna 733a toward the earth-based large terminals 31 and 32, whereas it is provided for receiving a radio signal from the earth-based large terminals 31 and 32 through the antenna 733a, and then converting the received radio signal into a baseband signal by demodulating the received radio signal; and (d) a signal repeater exchange unit 730 connected with these transceivers 731, 732 and 733 for relaying and switching a baseband signal from one of the transceivers 731, 732 and 733 to another one of the transceivers 731, 732 and 733 while amplifying the same baseband signal.

In this arrangement, the satellite communication stations carried on the EO satellites 2 of the second layer are assigned to relaying data to satellite communication stations in several earth orbits of the EO satellites 1 of the first layer below, and perform the optical inter-satellite communications with the satellite communication stations in the earth orbits of those EO satellites 1 of the first layer.

In this arrangement, for example, the satellite communication station 211 is connected with the gateway station 31 via the communication path 331 and to the satellite communication stations 111 and 121 via the communication path 511 and 512, respectively, and is further connected with the satellite communication stations 212 and 221 via communication paths 611 and 616, respectively. Further, for example, the satellite communication station 221 is connected with the gateway station 31 via the communication path 331a and to the satellite communication stations 133 and 142 via communication paths 513 and 514, respectively, and is further connected with the satellite communication stations 232, 222 and 211 via communication paths 615, 616 and 617, respectively. Accordingly, each of the satellite communication stations 211, 212, 221, 222, 231 and 232 carried on the EO satellites 2 of the second layer has a function of feeder link with the gateway station 31 for interlink with the earth-based communication networks 41 through 43, and provides communication lines or circuits of large capacity with the large fixed terminal 32.

Figure 5:
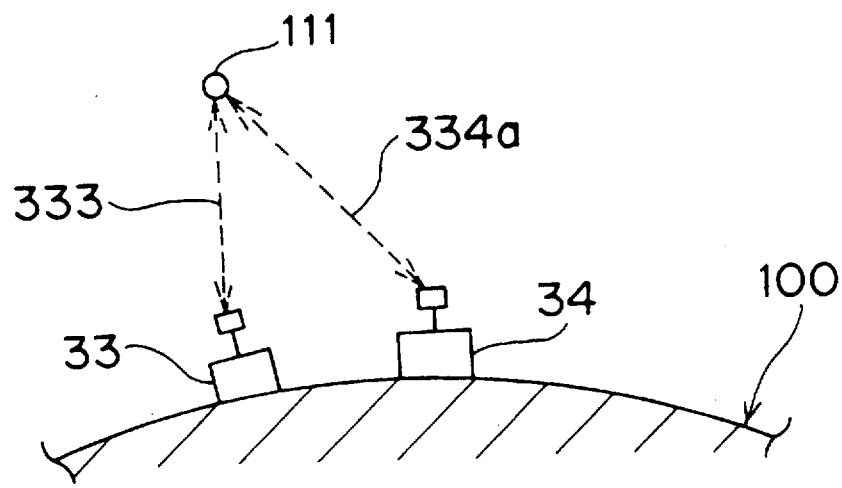
FIG. 5 is a perspective view showing an example of a communication path between a small fixed terminal 33 and a small fixed terminal 34 in the satellite communication system shown in FIG. 1.

For communications between one small user terminal and another small user terminal, if both the small terminals are covered by any one of the satellite communication stations of the EO satellites 1 of the first layer, the satellite communication station thereof relays the communication signals to link the communication line or circuit between one user small terminal with its counterpart another user small terminal. For example as shown in FIG. 5, the small fixed terminal 33 is connected with the satellite communication station 111 via the communication path 333, and further, the satellite communication station 111 is connected with the small fixed terminal 34 via the communication path 334a. This results in the communication line or circuit between the small terminals 33 and 34.

Figure 6:
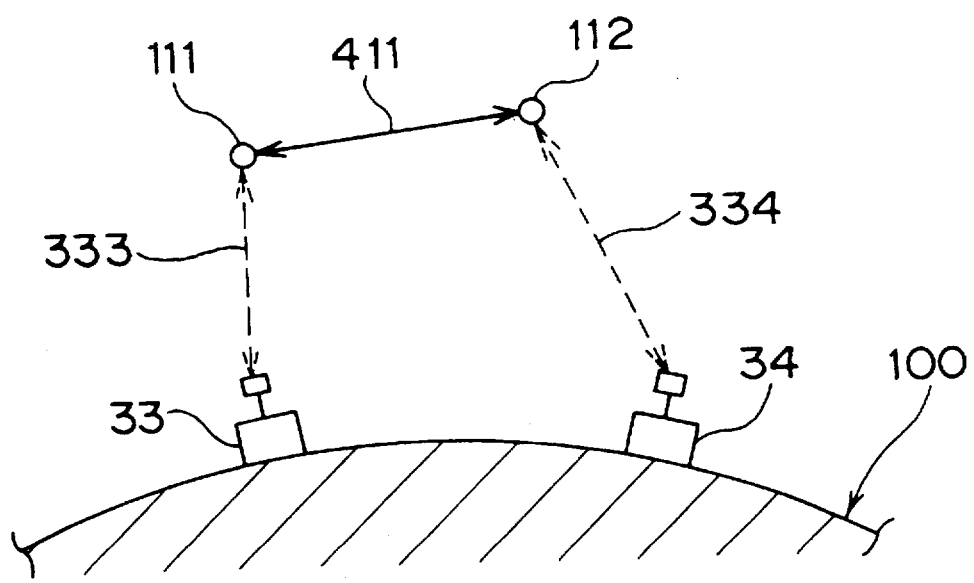
FIG. 6 is a perspective view showing another example of a communication path between the small fixed terminal 33 and the small fixed terminal 34 in the satellite communication system shown in FIG. 1.

If the two satellite communication stations which provide services to both small terminals are located in the same orbital plane, the communication line is linked through the inter-satellite communication within the same earth orbit. Referring back to FIG. 1, for example, when the small fixed terminal 34 is out of the coverage of the satellite communication station 111, however, it is within the coverage of the satellite communication station 112, then the small fixed terminal 33 is connected with the satellite communication station 111 via the communication path 333, the satellite communication station 111 is connected with the satellite communication station 112 via the communication path 411, as shown in FIG. 6. Further, the satellite communication station 112 is connected with the small fixed terminal 34 via the communication path 334. This results in the communication line between the small terminals 33 and 34.

Figure 7:
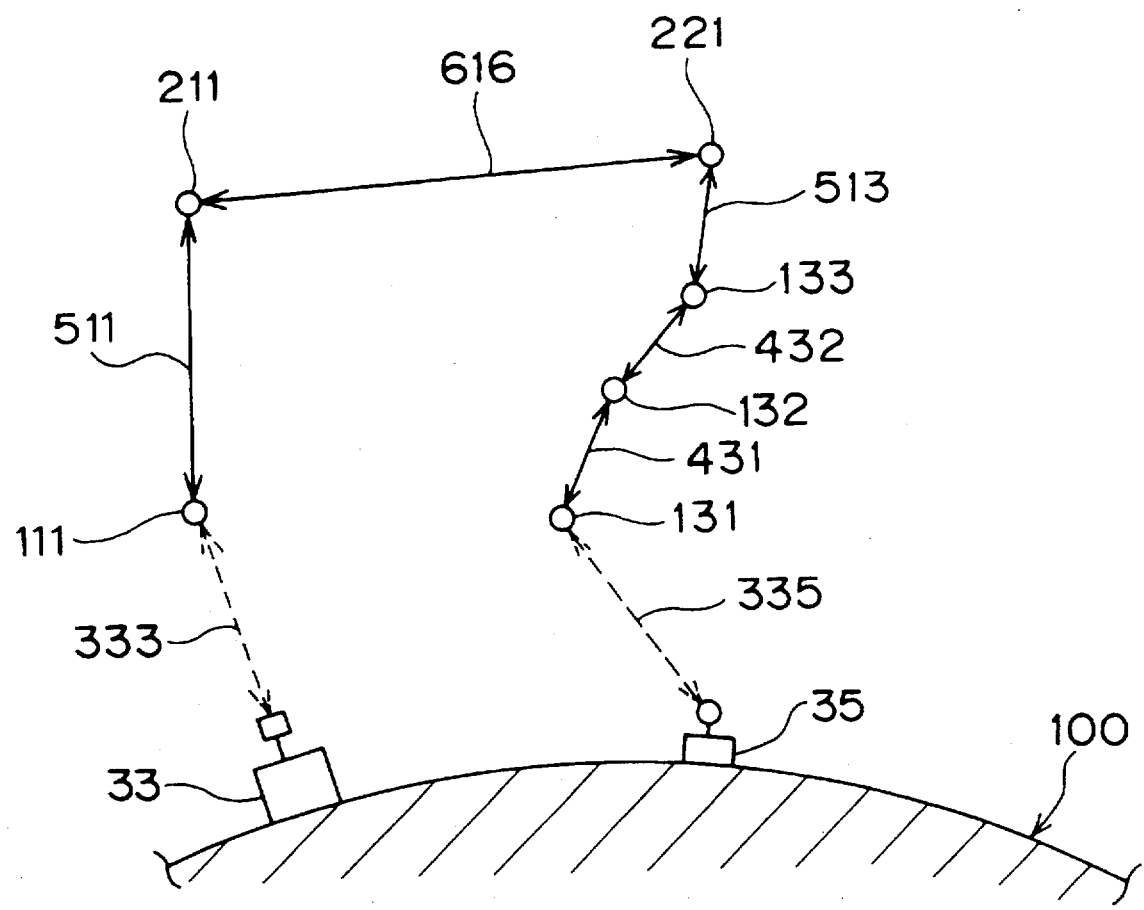
FIG. 7 is a perspective view showing another example of a communication path between the small fixed terminal 33 and a personal terminal 35 in the satellite communication system shown in FIG. 1.

Further, when the counterpart small terminal to be communicated from one small terminal is located within the coverage of a satellite within another orbital plane, a communication line is linked as follows. The communication signal is sent from a satellite communication station of the EO satellites 1 of the first layer to a satellite communication station of the EO satellites 2 of the second layer, then, the communication signal is relayed between two satellite communication stations of the EO satellites 2 of the second layer, and the communication signal is further sent from the satellite communication station of the EO satellites 2 of the second layer to a satellite communication station of another EO satellites 1 of the first layer. Thereafter, the communication signal is sent from a satellite communication station of the EO satellites 1 of the first layer which can be connected with the counterpart small terminal, to the counterpart small terminal. For example, as shown in FIG. 7, the small fixed terminal 33 is connected with the satellite communication station 111 via the communication path 333, and the communication satellite station 111 is connected with the satellite communication station 211 via the communication path 511. Further, the satellite communication station 211 is connected with the satellite communication station 221 via the communication path 616, and the satellite communication station 221 is connected with the satellite communication station 131 via the communication path 513, the satellite communication station 133, a communication path 432, the satellite communication station 132 and the communication path 431. Further, the satellite communication station 131 is connected with the personal terminal 35 via the communication path 335. This results in a communication line between the small terminals 33 and 35.

Further, when a small user terminal communicates with a counterpart terminal within the other network, or when the small user terminal communicates with a large terminal, the communication line is linked as follows. An optical inter-satellite communication line is connected from the satellite communication station of an EO satellite 1 of the first layer located just above the small terminal through the satellite communication station of an EO satellite 2 of the second layer located just above the earth orbit of the EO satellite 1 of the first layer, to a satellite communication station of an EO satellite 2 of the second layer located above the counterpart station. Further, the small user terminal transmits and receives data to and from the gateway station 31 or the large fixed terminal 32.

Figure 8:
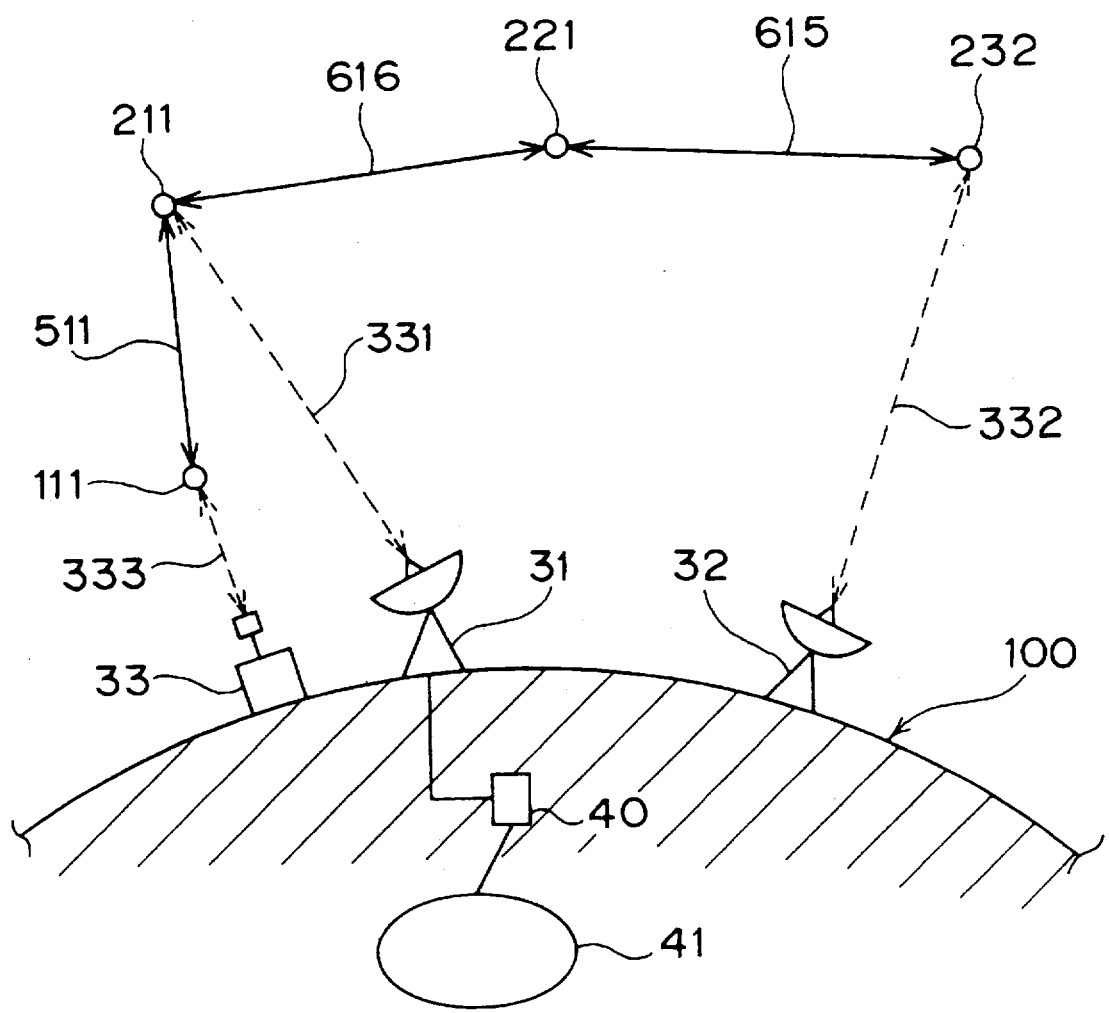
FIG. 8 is a perspective view showing an example of a communication path between the small fixed terminal 33 and an earth-based network 41 and another example of a communication path between the small fixed terminal 33 and a large fixed terminal 32 in the satellite communication system shown in FIG. 1.

In the former case, for example, as shown in FIG. 8, the small fixed terminal 33 is connected with the satellite communication station 111 via a communication path 333, and the satellite communication station 111 is connected with the satellite communication station 211 via a communication path 511. Further, the satellite communication station 211 is connected with the gateway station 31 via a communication path 331, and the gateway station 31 is further connected with the earth-based network 41 via the signal repeater exchange unit 40.

In the latter case, on the other hand, for example as shown in FIG. 8, the small fixed terminal 33 is connected with the satellite communication station 111 via a communication path 333, and further, the satellite communication station 111 is connected with the satellite communication station 232 via a communication path 511, the satellite communication station 211, a communication path 616, the satellite communication station 221 and a communication path 615. Further, the satellite communication station 232 is connected with the large terminal 32 via a communication path 332.

Figure 9:
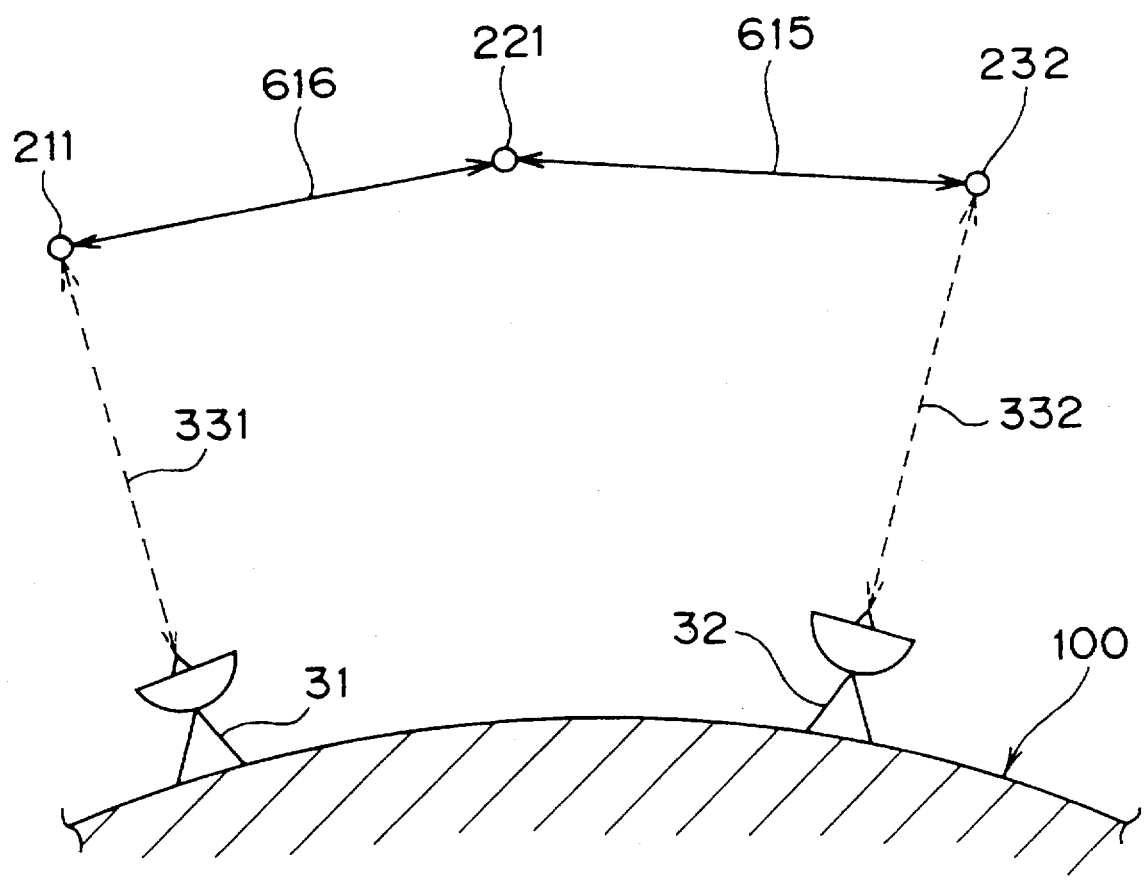
FIG. 9 is a perspective view showing an example of a communication path between a gateway station 31 and the large fixed terminal 32 in the satellite communication system shown in FIG. 1.

Furthermore, when communication is performed between the gateway station 31 and the large fixed terminal 32, for example, as shown in FIG. 9, the gateway station 31 is connected with the satellite communication station 211 via a communication path 331, and further, the satellite communication station 211 is connected with the satellite communication station 232 via a communication path 616, the satellite communication station 221, and a communication path 615. Further, the satellite communication station 232 is connected with the large terminal 32 via the communication path 332.

Figure 2:
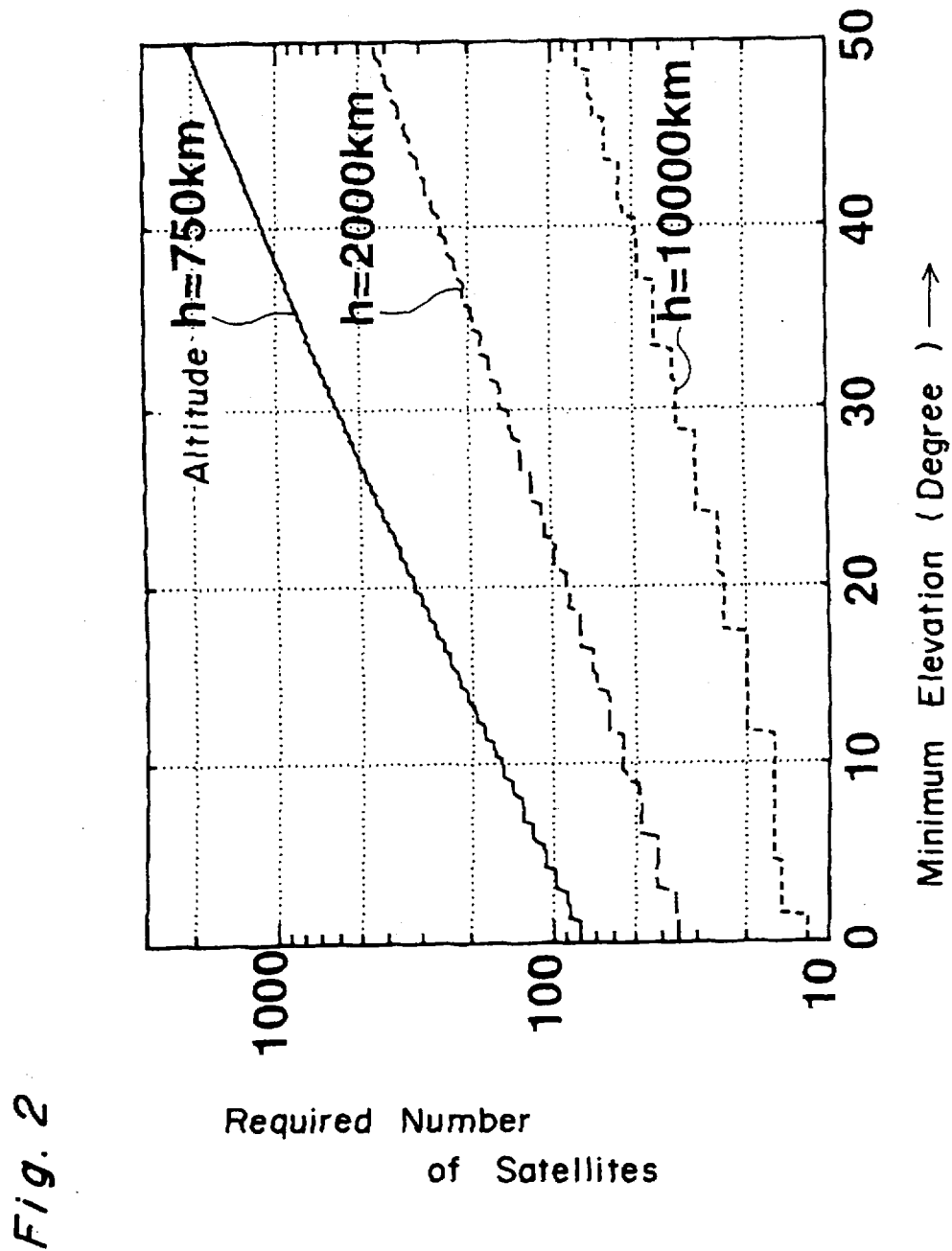
FIG. 2 is a graph showing the number of satellites required for the minimum elevation angle in the satellite communication system shown in FIG. 1.

FIG. 2 shows the required number of satellites enough in order to obtain a range in which communication is possible with at least two communication satellites present at desired elevation angles or more at every spot on the earth at every time, that is, in order to obtain a continuous coverage of two satellites. As is apparent from FIG. 2, the required number of satellites largely depends on the orbit altitude of satellites and the required minimum elevation angle. Further, as shown in FIG. 2, it can be understood that the required number of satellites increases as the orbit altitude decreases, and that whereas only tens of satellites or less are required at an orbit altitude of 10000 km, and several hundreds to two thousands of satellites are required at an orbit altitude of 750 km.

Link parameters associated with communications between satellite communication stations and earth stations, and inter-satellite communications between satellite communication stations also depend on the orbit altitude of satellites. Table 1 shows communication parameters for the orbit altitudes of satellites, 750 km, 2000 km and 10000 km for the comparison thereamong. In this case, the minimum elevation angle is assumed to be 10 degrees. As for the orbit altitude of 750 km, a communication parameter at a minimum elevation angle of 30 degrees is also shown. It is noted that the azimuth axis of the acquisition and tracking system gimbals of inter-satellite link terminals in the satellite communication stations is directed toward the zenith, i.e., anti-earth center direction.

TABLE 1

| | Altitude (km) | | | |
|---|---|---|---|---|
| | 750 | 750 | 2000 | 10000 |
| Required minimum elevation (degree) | 30 | 10 | 10 | 10 |
| Number of satellites | 598 | 156 | 56 | 16 |
| Number of orbital planes | 23 | 12 | 7 | 4 |
| Number of satellites per plane | 26 | 13 | 8 | 4 |
| Orbital parameters: | | | | |
| Satellite intervals in a plane (degree) | 13.84 | 27.69 | 45.0 | 90.0 |
| Spacing between co-rotating planes (degree) | 7.91 | 15.3 | 26.6 | 47.5 |
| Spacing between counter-rotating planes (degree) | 5.98 | 11.7 | 20.4 | 37.5 |
| Phasing angle between co-rotating planes (degree) | 0.6 | 1.5 | 2.7 | 4.8 |
| Ground-Satellite links: | | | | |
| Maximum visible duration for a satellite (minute) | 5.1 | 10.1 | 22.2 | 110.9 |
| Maximum angular velocity (degree/second) | 0.571 | 0.571 | 0.198 | 0.028 |
| Maximum range (km) | 1316 | 2262 | 4437 | 14018 |
| Free space loss (dB, relative value) | −4.7 | 0 | 5.9 | 15.9 |
| ISL in the same plane: | | | | |
| Range (km) | 1718 | 3412 | 6412 | 23162 |
| Free space loss (dB, relative value) | −6.0 | 0 | 5.5 | 16.6 |

TABLE 1-continued

| | Altitude (km) | | | |
|---|---|---|---|---|
| | 750 | 750 | 2000 | 10000 |
| Required minimum elevation (degree) | 30 | 10 | 10 | 10 |
| Relative motion (degree, orbit keeping error 10 km) | 0.33 | 0.17 | 0.089 | 0.025 |
| ISL between co-rotating planes: | | | | |
| Azimuth range (degree) | −87.0 ~−87.0 | −87.7 ~−87.7 | −91.5 ~−91.5 | −100.4 ~−100.4 |
| Elevation range (degree) | −4.0 ~−0.3 | −8.0 ~−0.7 | −13.4 ~−1.3 | −23.9 ~−2.2 |
| Range (km) | 74 ~ 986 | 185 ~1907 | 384 ~3870 | 1260 ~13300 |
| Maximum azimuth change rate (degree/second) | 0.79 | 0.62 | 0.47 | 0.18 |
| ISL between counter-rotating planes: | | | | |
| Maximum azimuth change rate (degree/second) | 1.15 ~204 | 0.59 ~6.0 | 0.26 ~1.9 | 0.05 ~0.41 |
| visible duration (minute) | 12.5 ~12.6 | 12.1 ~12.6 | 26.2 ~27.5 | 123.9 ~144.9 |
| Free space delay (msecond, to opposite of earth) | 80 | 77 | 99 | 221 |

As shown in Table 1, for the links between satellite communication stations and earth stations, there is such an advantageous effect or feature that the lower the orbit altitude, the less the free space loss. This is the most important feature for small terminals such as mobile terminals and personal terminals which need to be miniaturized by reducing the antenna diameter and the transmission power thereof. However, the lower the orbit altitude, the shorter the duration (or visible time) for which a satellite stays at the minimum elevation angle or higher, so that the angular velocity of the satellite when viewed from earth-based terminals also appears much larger. These features require an excessively high satellite tracking performance in the terminals because of frequent handovers and high speed driving. For small terminals which control the beam direction electrically using phased array antennas of the mobile terminal 36, these requirements pose almost no problem, however, very large loads are involved in the mechanically driven large antennas of the gateway station 31 or the large fixed terminal 32 that implements communications of large capacity. Consequently, a lower altitude is essential for small terminals, while a relatively high altitude is suitable for the large fixed terminal 32 and the gateway station 31 equipped with high gain antennas and high power transmitters.

Figure 3:
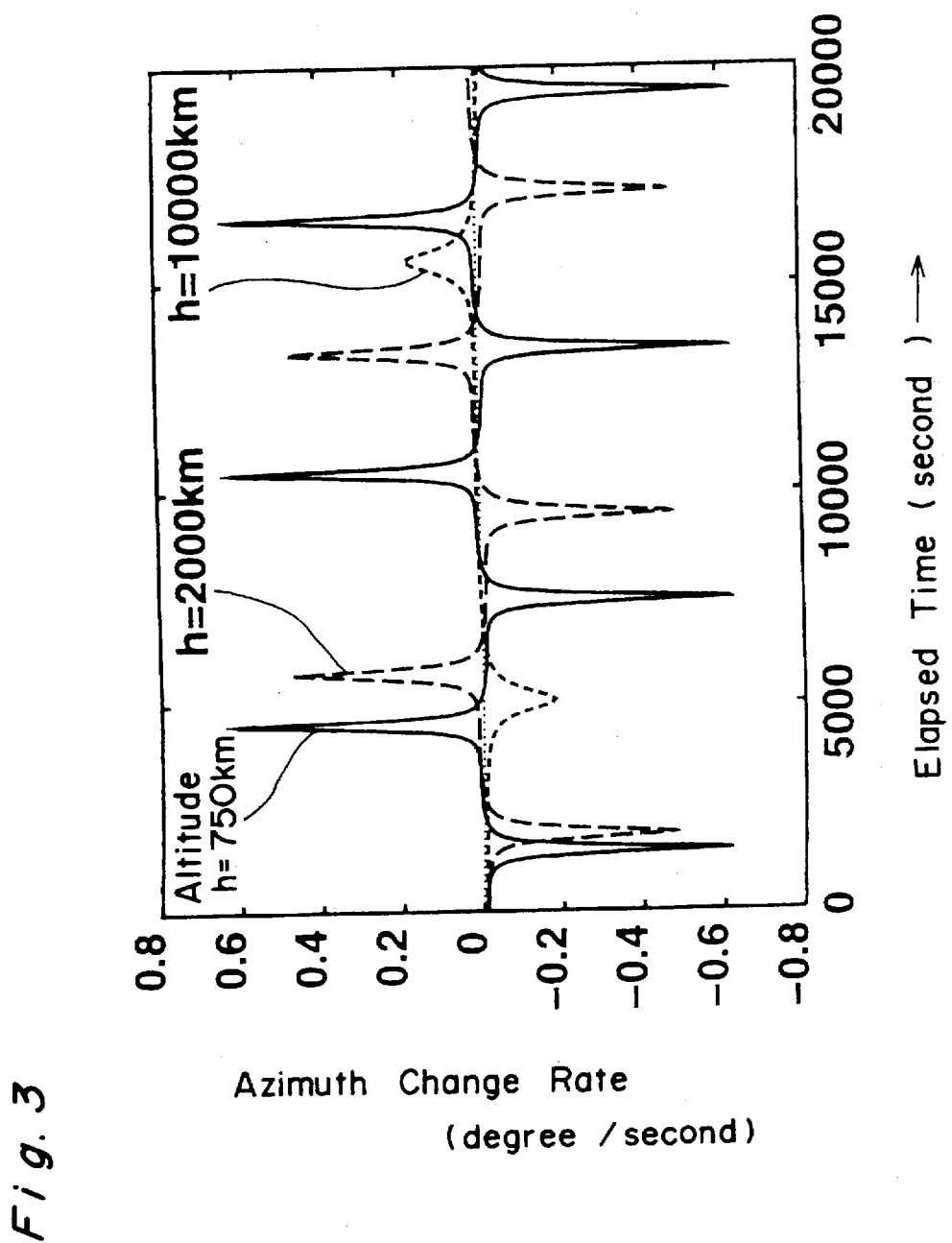
FIG. 3 is a graph showing an azimuth change rate plotted against the elapsed time in inter-satellite links between orbital planes of rotation in the co-rotating direction in the satellite communication system.
Figure 4:
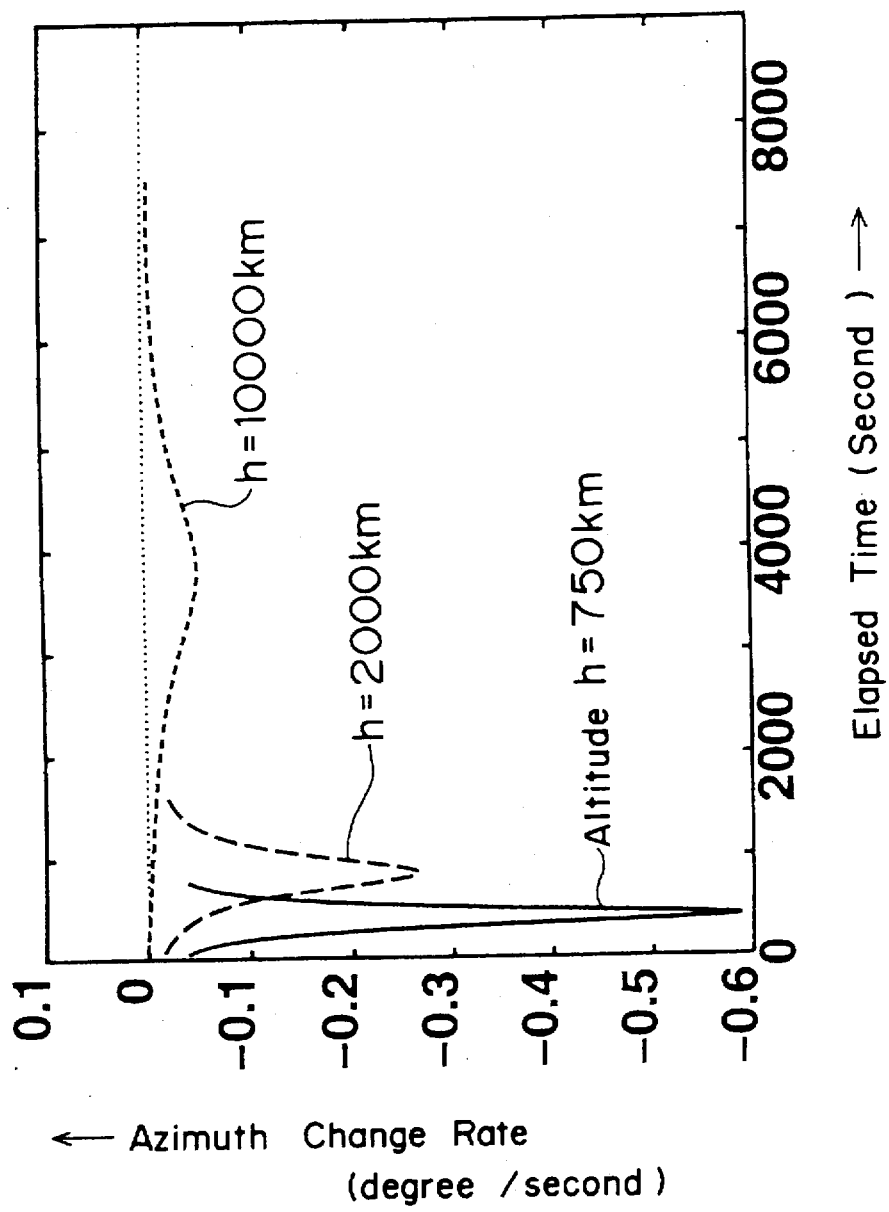
FIG. 4 is a graph showing an azimuth change rate plotted against the elapsed time in inter-satellite links between orbital planes of rotation in the counter-rotating direction in the satellite communication system.

Further, for the inter-satellite links between satellite communication stations of the same layer, the lower the orbit altitude, the shorter the inter-satellite ranges, and therefore, the smaller the free space loss. However, a higher altitude is more desirable in which the requirement conditions for the acquisition and tracking system become looser in terms of links with satellites on adjacent orbital planes, and this results in smaller size and weight of the acquisition and tracking mechanism. The reasons therefor are as follows:

(a) First of all, the angular velocity of adjacent satellites is smaller. FIGS. 3 and 4 show the azimuth change rate of the counterpart satellite versus the elapsed time for an inter-satellite link between co-rotating and counter-rotating orbits, respectively. The angular velocity of the counter-rotating satellite crossing above the pole becomes considerably large, close to the listed maximum value in Table 1. It is impossible to perform the tracking with the angular velocity shown in Table 1 at the altitude of 750 km.

(b) Secondly, the visible duration for the satellites of the counter-rotating orbit are longer at higher altitudes. This feature means that stabler links are possible between counter-rotating orbits.

(c) Thirdly, in the inter-satellite link in the same orbital plane, the higher the altitude, the smaller the relative orbital motions between satellites caused by the orbit keeping errors of the satellites. Provided that higher power laser sources become available in the future, earth orbits of higher altitudes are desirable also for the inter-satellite links.

The free space propagation delay is obviously shorter for lower altitudes. For example, the delay of sending messages to the opposite side of the earth using middle earth orbit satellites is about two-fold larger than that obtained when low earth orbit satellites are used. Consequently, the altitude of the satellites must be selected by considering the number of required satellites, the link properties with ground or earth-based terminals, the inter-satellite link features, and the propagation delay time.

In a more preferred embodiment, the altitude for the EO satellites 1 of the first layer, which is the lower layer, is assumed to be 750 km, and that for the EO satellites 2 of the second layer, which is the upper layer, is assumed to be 2000 km or 10000 km. The orbital parameters and the communication link parameters for both layers are shown in Table 1.

Although a minimum elevation of 30 degrees is required for the EO satellites 1 of the first layer to provide the communications with less shadowing for moving objects and the like, a decrease to 10 degrees is possible for the gateway station 31 and the large fixed terminal 32 since they can be located at the most suitable positions free from shadowing. As a result, the number of the EO satellites 2 of the second layer, which are heavier, more complex, and more expensive than the EO satellites 1 of the first layer, can be reduced. For example, a global two-satellite coverage can be realized by using 56 satellites for an altitude of 2000 km, and also it can be realized by using 16 satellites for an altitude of 10000 km. Although 598 satellites are required for the EO satellites 1 of the first layer, the satellite stations thereof can be miniaturized by excluding the radio links of high-bit rates with the gateway stations 31 or large fixed terminals 32 and by using optical free-space communications for the inter-satellite links.

In the satellite communication system constructed as described above, convenient link properties for each link can be selectively used. For example, for the communications with the small terminals 33 through 36, the free space loss for the links can be reduced by using the satellite communication stations carried on the EO satellites 1 of the first layer having relatively short communication paths. For communications with the gateway station 31 and the large fixed terminal 32 or inter-satellite communications between satellite communication stations, longer visible durations are possible by reducing the angular velocity of relative motion with the use of the satellite communication stations of the EO satellites 2 of the second layer. Further, if a relatively high altitude is adopted, such as 10000 km, as the orbit altitude of the EO satellites 2 of the second layer, it is inevitable that the free space propagation delay will become large. Nevertheless, the delay for data transmission to the opposite side of the earth using the altitude of 10000 km is still smaller than the delay for one hop using a geostationary satellite. In this point, any system using this constellation would be superior to systems using data relays by geostationary satellites such as the conventional system, MOBIL-SATCOM. For example, if the communications with a smaller delay are desired, an altitude of 2000 km can be selected as the orbit altitude for the EO satellites 2 of the second layer. However, the required number of EO satellites 2 of the second layer would increase.

Next, the inter-satellite link between two satellites will be described below. As an example, the orbit altitude for the EO satellites 1 of the first layer, which is the lower layer, is assumed to be 750 km and that for the EO satellites 2 of the second layer is assumed to be 2000 km or 10000 km. With these assumptions, the inter-satellite link properties between two layers were evaluated. The results of the evaluation are shown in Table 2.

TABLE 2

| Altitude of upper layer (km) | 2000 | 10000 |
| --- | --- | --- |
| Visible duration (min) | 148 ~ 160 | 62 ~ 77 |
| Duration for staying in upper hemisphere (min) | 48 ~ 82 | 44 ~ 50 |
| Range (km) | 1250 ~ 7930 | 9250 ~ 17700 |
| Range in upper hemisphere (km) | 1250 ~ 4400 | 9250 ~ 14700 |
| Terminal of lower layer satellites: | | |
| Azimuth range (degree) | ±113 | ±114 |
| Elevation range (degree) | ±85 | ±72 |
| Maximum azimuth change rate (degree/second) | 0.152 | 0.097 |
| Maximum azimuth change rate (degree/second) | 0.142 | 0.023 |
| Terminal of upper layer satellites: | | |
| Azimuth range (degree) | ±58 | ±26 |
| Elevation range (degree) | ±58 | ±25 |
| Maximum azimuth change rate (degree/second) | 0.074 | 0.033 |
| Maximum azimuth change rate (degree/second) | 0.154 | 0.034 |

When the EO satellites 2 of the second layer are deployed so that a continuous coverage of at least one satellite can be obtained with the minimum elevation angle of 10 or more degrees as seen from an earth station, any one of the EO satellites 1 of the first layer can view at all times at least one or more EO satellites 2 of the second layer in the upper hemisphere of the satellite. Consequently, it is possible for every satellite communication station of the EO satellites 1 of the first layer to use at all times an inter-satellite link with a satellite communication station of the EO satellites 2 of the second layer. On the other hand, since any of the EO satellites 2 of the second layer can view at all times several orbits of the EO satellites 1 of the first layer, the satellite communication station can communicate with the satellite communication stations of several satellites within the earth orbits of the EO satellites 1 of the first layer.

The azimuth axis of the antenna for the inter-satellite link is directed toward the normal of the orbital plane since the components of relative motions of satellites in the orbital plane are larger than those perpendicular to the plane. Since the satellite of the communication counterpart will not come into the direction of this axis, the so-called gimbal lock can be avoided. The range of antenna drive and azimuth change rate of inter-satellite link terminals in this case are shown in Table 2.

As is apparent from Table 2, with respect to the azimuth change rate and the elevation change rate, the azimuth change rate is considerably smaller than that of the inter-satellite link within the layer as shown in Table 1, so that tracking is easy. The tracking range of the elevation angle is wider than that of the inter-satellite link in the layer. However, the performance required of the tracking system is almost the same. Consequently, the inter-satellite link between two layers can be easily implemented only with the same specifications as terminals used in the inter-satellite link between adjacent orbital planes in the same layer, except that the gimbal axes are oriented in different directions.

Even when the use of a tracking system in which the antenna of an inter-satellite link terminal for inter-layer communication, which antenna is to be mounted on the EO satellites 1 of the first or lower layer, is limited in its direction to the upper hemisphere of the satellite (the hemisphere opposite to the globe), a continuous visible duration of more than 40 minutes can be obtained so that a stable inter-satellite link is ensured. Further, when the satellite communication station of the satellite to be connected is switched, the communication will never be interrupted since the satellite link is provided via satellite communication stations of other satellites in the same orbital plane.

Although the orbit altitude of satellites needs to be low for providing high-quality communications to small user terminals, the required number of satellites increases. In the conventional single altitude satellite constellation, all the satellites are required to be provided with all the communication functions such as communication with user terminals, feeder links to gateway stations, and inter-satellite links with four or more adjacent satellites. As a result, all the satellites would become large and heavy. In the satellite communication system of the present preferred embodiment with a double-layered constellation, since the satellite communication stations of the satellites deployed as the EO satellites 1 of the first layer can be reduced in size and simplified in construction since they have only the communication function with small terminals of the earth stations, and three inter-satellite communication devices. Although the EO satellites 2 of the second layer are heavier and more complex than the EO satellites 1 of the first layer, a far smaller number of satellites are only required. Thus, the cost of the whole satellite system can be further reduced.

The satellite constellation in the satellite communication system of the present preferred embodiment is a combination of advantages of the low earth orbit satellite constellation with advantages of the middle earth orbit satellite constellation. Accordingly, properties advantageous for each communication link can be selectively used. For example, for communications with small terminals, the free space loss can be reduced by using satellite communication stations of the EO satellites 1 of the first layer which is the lower layer. On the other hand, for communications with the gateway station 31 and the large fixed terminal 32 of high bit rates, the angular velocity of relative motions can be reduced by using the second satellite communication stations of the EO satellites 2 of the second layer which is the upper layer, so that easier tracking and longer visible duration can be realized. Further, for inter-satellite links other than within the same orbital plane, the antenna driving velocity for tracking can be reduced by using the EO satellites 2 of the second layer which is the upper layer, and then, the acquisition and tracking system can be simplified as compared with those of the prior art system.

In the satellite communication system of the present preferred embodiment, satellites of altitudes suitable for the characteristics of terminals can be selectively used, and satellite communication stations of the EO satellites 1 or 2 of either layer, whichever it is, can be used by the same terminal in relatively low-velocity communications such as sound communications or the like. Accordingly, the redundancy of information is increased and the effect of shadowing caused by buildings or the like in mobile communications can be reduced, so that the communicatable duration rate can be enhanced. Further, the number of satellites which provide services to the same spot can be increased only by increasing the number of satellites of the lower layer, which are small and inexpensive to launch, so that the satellite diversity can be realized as shown below.

When the mobile communication or the communication with EO satellites is performed, there may occur a shadowing, that is, the communication path may be shielded into a line break with moving communication terminals or satellites. In this case, under the communication with a single satellite, the communication is interrupted, and the communication is impossible until the satellite or another becomes visible again. However, if two or more satellites are deployed so as to be serviceable to the same spot, it is possible to connect the communication line to the most favorable of communicatable satellites. Even if a plurality of satellites can be viewed from the same spot, merely as it is, it would be necessary to connect the communication line again since the communication will be interrupted at the time of switching. However, if a network is constructed for the satellite diversity by using inter-satellite communication, it becomes possible to switch the satellites in real time, and therefore to offer or provide continuous, stable communication services without line breaks. The larger the number of satellites which provide communication services to the same spot, and the less deviation or the more uniform the distribution of satellites involves when viewed from the ground of the earth, the more remarkable the effect of the above-mentioned satellite diversity and the higher the communicatable time rate is.

Further, when a high altitude such as 10000 km is used as the altitude for the EO satellites 2 of the second layer, the free space delay time is somewhat prolonged, however, it is shorter than that for one hop relay using a geostationary satellite even if data is sent to the opposite side of the earth. In this respect, the preferred embodiment of the present invention is superior to the second prior art system, such as the conventional system, MOBILSATCOM, in which data is relayed by the geostationary satellite. When a less delay time is desired, an altitude of about 2000 km may properly be selected as the altitude for the EO satellites 2 of the second layer.

In the conventional one-layer network, if a low altitude is used, tens of times of inter-satellite links would be required to communicate with a remote place such as the opposite side of the earth, and complicated selection of communication paths would be involved since all the satellites are connected in a two-dimensional fashion. However, in the present preferred embodiment according to the present invention, the channels within the EO satellites 1 of the first layer are provided in one dimension, while the EO satellites 2 of the second layer are higher in orbit altitude and less in the number of satellites. Accordingly, the optimal communication path can be easily determined, so that the relay switching function mounted on the satellites can be simplified and made faster in velocity. Further, the frequency of relay itself at the satellite communication station can be reduced. As a consequence, the transmission delay due to the data processing and exchange in the relaying satellites can be largely reduced.

In the above-described preferred embodiment, the communication between earth stations and satellite communication stations is carried out through the radio inter-satellite communication line or circuit by the radio inter-satellite communication method while the communication between two satellite communication stations is carried out through the optical inter-satellite link communication line or circuit by the optical inter-satellite link communication method. However, the present invention is not limited to such arrangement. The communication between two satellite communication stations may be carried out through the radio satellite communication line or circuit by the radio satellite communication method using frequency bands such as quasi-millimeter, millimeter wave bands, or the like.

In the conventional single layered satellite constellation, there is such a problem that an extremely large number of satellite stations will be required when the satellite communication stations are deployed at relatively low altitudes, whereas the propagation loss becomes relatively large when the satellites are deployed at relatively high altitudes. In the preferred embodiment of the present invention, satellite communication services with small propagation loss and high quality can be provided at lower cost by using a smaller number of large communication satellites and a large number of small communication satellites, by combining two different orbit altitudes. Further, satellite stations of more suitable orbit altitudes can be selectively used depending on the characteristics of communication terminals. Further, the services provided by a plurality of satellite communication stations to the same spot can be implemented easily. For example, the satellite diversity can be used, and in this case, a higher quality satellite communication service can be offered or provided.

In the satellite communication system of one aspect of the preferred embodiment according to the present invention, the first orbit altitude is preferably set to one altitude in a range of 700 km to 2000 km while the second orbit altitude is preferably set to one altitude in a range of 1200 km to 2000 km or a range of 10000 km to 20000 km. This prevents occurrence of troubles in communication due to the intense radiation in the Van Allen band, as well as drags by the atmosphere.

Further, in the satellite communication system of another aspect according to the present invention, preferably, the communication between one of the first satellite communication stations and another of the first satellite communication stations, the communication between one of the second satellite communication stations and another of the second satellite communication stations, and the communication between the first satellite communication station and the second satellite communication station are carried through an optical inter-satellite communication line or circuit by an optical inter-satellite communication method, while the communication between the first satellite communication station and the small terminals and the communication between the second satellite communication station and the large terminals are carried out through a radio satellite communication line or circuit by a radio satellite communication method. This makes it easy to realize a satellite communication system.

Further, in the satellite communication system of a further aspect according to the present invention, preferably, the communication between one of the first satellite communication stations and another of the first satellite communication stations, the communication between one of the second satellite communication stations and another of the second satellite communication stations, and the communication between the first satellite communication station and the second satellite communication station, the communication between the first satellite communication station and the small terminals, and the communication between the second satellite communication station and the large terminals are carried out through a radio satellite communication line or circuit by a radio satellite communication method. This makes it easy to realize the satellite communication system.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A satellite communication system having a double-layered earth orbit satellite constellation with two different altitudes including a predetermined first orbit altitude and a predetermined second orbit altitude higher than the first orbit altitude, comprising:

a plurality of first communication satellites deployed in each of a plurality of earth orbits located at the first orbit altitude, each of said plurality of first communication satellites having a first satellite communication station;

a plurality of second communication satellites deployed in each of a plurality of earth orbits located at the second orbit altitude, each of said plurality of second communication satellites having a second communication satellite station;

a plurality of small terminals provided as earth stations on the earth, each of said plurality of small terminals being used as one of a mobile terminal and a semi-fixed terminal; and a plurality of large terminals provided as earth stations on the earth, each of said plurality of large terminals being used as a fixed terminal, wherein each of said first satellite communication stations comprises:

first communication means for communicating with at least one of said plurality of small terminals and for communicating with at least one of said first satellite communication stations of adjacent first communication satellites within the same earth orbit and said plurality of second satellite communication stations; and first repeater exchange means for relaying and switching a signal of at least two of said communications performed by said first communication means, wherein each of said second satellite communication stations comprises:

second communication means for communicating with at least one of said plurality of large terminals and for communicating with at least one of said second satellite communication stations of adjacent communication satellites within the same earth orbit, said second satellite communication stations of said second communication satellites of both adjacent earth orbits, and said plurality of first satellite communication stations; and second repeater exchange means for relaying and switching a signal of at least two of said communications performed by said second communication means, wherein each of said small terminals comprises third communication means for communicating with at least one of said plurality of first satellite communication stations, and wherein each of said large terminals comprises fourth communication means for communicating with at least one of said plurality of second satellite communication stations.

2. The satellite communication system as claimed in claim 1, wherein said first orbit altitude is set to an altitude within a range of 700 km to 2000 km, and wherein said second orbit altitude is set to an altitude within one of a range of 1200 km to 2000 km and a range of 10000 km to 20000 km.

3. The satellite communication system as claimed in claim 2, wherein (a) communications between one of said first satellite communication stations and another one of said first satellite communication stations, (b) communications between one of said second satellite communication stations and another one of said second satellite communication stations, and (c) communications between said first satellite communication stations and said second satellite communication stations are carried out through optical satellite communication lines, and wherein (d) communications between said first satellite communication stations and said small terminals, and (e) communications between said second satellite communication stations and said large terminals are carried out through radio satellite communication lines.

4. The satellite communication system as claimed in claim 2, wherein (a) communications between one of said first satellite communication stations and another one of said first satellite communication stations, (b) communications between one of said second satellite communication stations and another one of said second satellite communication stations, (c) communications between said first satellite communication stations and said second satellite communication stations, (d) communications between said first satellite communication stations and said small terminals, and (e) communications between said second satellite communication stations and said large terminals are carried out through radio satellite communication lines.

5. The satellite communication system as claimed in claim 1, wherein (a) communications between one of said first satellite communication stations and another one of said first satellite communication stations, (b) communications between one of said second satellite communication stations and another one of said second satellite communication stations, and (c) communications between said first satellite communication stations and said second satellite communication stations are carried out through optical satellite communication lines, and wherein (d) communications between said first satellite communication stations and said small terminals, and (e) communications between said second satellite communication stations and said large terminals are carried out through radio satellite communication lines.

6. The satellite communication system as claimed in claim 1, wherein (a) communications between one of said first satellite communication stations and another one of said first satellite communication stations, (b) communications between one of said second satellite communication stations and another one of said second satellite communication stations, (c) communications between said first satellite communication stations and said second satellite communication stations, (d) communications between said first satellite communication stations and said small terminals, and (e) communications between said second satellite communication stations and said large terminals are carried out through radio satellite communication lines.

* * * * *